(12) United States Patent
Cosman

(10) Patent No.: US 7,524,564 B2
(45) Date of Patent: *Apr. 28, 2009

(54) POLYMER BLEND AND COMPOSITIONS AND METHODS FOR USING THE SAME

(75) Inventor: Michael A. Cosman, Valencia, CA (US)

(73) Assignee: PRC DeSoto International, Inc., Glendale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/106,574

(22) Filed: Apr. 21, 2008

(65) Prior Publication Data

US 2008/0199694 A1     Aug. 21, 2008

Related U.S. Application Data

(60) Division of application No. 10/935,856, filed on Sep. 8, 2004, now abandoned, which is a continuation-in-part of application No. 10/837,337, filed on Apr. 30, 2004, now abandoned.

(51) Int. Cl.
*B32B 27/06* (2006.01)
*B32B 7/04* (2006.01)

(52) U.S. Cl. .......... 428/419; 428/354; 427/140; 427/372.2; 525/535; 528/373; 528/377

(58) Field of Classification Search .......... 428/419, 428/354; 427/140, 372.2; 525/535; 528/373, 528/377

See application file for complete search history.

(56) References Cited

OTHER PUBLICATIONS

Claims of U.S. Appl. No. 12/106,620.*

* cited by examiner

*Primary Examiner*—Duc Truong
(74) *Attorney, Agent, or Firm*—Diane R. Meyers

(57) ABSTRACT

A polymer blend having at least one polysulfide component and at least one polythioether component is disclosed. The polymer blend offers numerous advantages, including the ability to compatibilize formulations based on either polysulfide chemistry or polythioether chemistry alone. Compositions comprising the polymer blend, particularly sealant formulations for use in aerospace applications, are also disclosed, as are multilayer sealant assemblies and methods for repairing the same.

23 Claims, No Drawings

POLYMER BLEND AND COMPOSITIONS AND METHODS FOR USING THE SAME

CROSS REFERENCE TO RELATED APPLICATIONS

This application is a divisional of U.S. patent application Ser. No. 10/935,856 filed Sep. 8, 2004, now abandoned entitled "POLYMER BLEND AND COMPOSITIONS AND METHODS FOR USING THE SAME", which is a continuation-in-part of Ser. No. 10/837,337, filed Apr. 30, 2004 now abandoned.

FIELD OF THE INVENTION

The present invention relates to a polymer blend comprising at least one polysulfide component and at least one polythioether component.

BACKGROUND INFORMATION

Sulfur-containing polymers are known to be well suited for use in aerospace sealants due to their fuel resistant nature upon crosslinking. Polysulfide sealants offer high tensile strength, high tear strength, thermal resistance and resistance to high ultraviolet light. Such sealants also offer resistance to fuel and maintain their adhesion upon exposure to fuel.

Various sulfur-containing polymers, including for example thiol-terminated sulfur-containing polymers and polysulfide polymers, are used in commercially available sealant formulations. It is often desirable to use different sealant formulations in combination to achieve the desired properties contributed by each. For example, a sealant prepared from a polysulfide has good chemical resistance, whereas a sealant prepared with a polythioether has a lower Tg and a higher service temperature. Use of sealant formulations having different chemistries together, however, can often have long-term compatibility problems. The present invention addresses this issue.

SUMMARY OF THE INVENTION

The present invention is generally directed to a polymer blend comprising at least one polysulfide component and at least one polythioether component. Sealants comprising this blend and a curing agent are further within the scope of the invention.

DETAILED DESCRIPTION OF THE INVENTION

The present invention is directed to a polymer blend comprising at least one polysulfide component and at least one polythioether component.

The "polysulfide component" of the present invention comprises a polysulfide polymer that contains multiple sulfur-sulfur linkages, i.e., —[S—S]—, in the polymer backbone and/or in the terminal or pendant positions on the polymer chain. Typically, the polysulfide polymers in the present invention will have two or more sulfur-sulfur linkages. Suitable polysulfides are commercially available from Akzo Nobel under the name THIOPLAST. THIOPLAST products are available in a wide range of molecular weights ranging, for example, from less than 1100 to over 8000, with molecular weight being the average molecular weight in grams per mole. Particularly suitable is a number average molecular weight of 1000 to 4000. The crosslink density of these products also varies, depending on the amount of crosslinking agent used. The "—SH" content, i.e. the mercaptan content, of these products can also vary. The mercaptan content and molecular weight of the polysulfide can affect the cure speed of the blend, with cure speed increasing with molecular weight.

In some embodiments, it is desired to use a combination of polysulfides to achieve the desired molecular weight and/or crosslink density in the polymer blend. Different molecular weights and/or crosslink densities can contribute different characteristics to the blend and compositions incorporating the blend. For example, blends wherein the polysulfide component comprises more than one polysulfide polymer and one of the polysulfide polymers has a molecular weight of approximately 1000 have desirable non-crystallization properties.

The second component in the polymer blend of the present invention is a polythioether. The "polythioether component" of the present invention is a polymer comprising at least one polythioether linkage, i.e., —[CH$_2$—CH$_2$—S—CH$_2$—CH$_2$]—. Typical polythioethers have from 8 to 200 of these linkages. Polythioethers suitable for use in the present invention include those described in U.S. Pat. No. 6,372,849. Suitable polythioethers typically have a number average molecular weight of 1000 to 10,000, such as 2,000 to 5,000 or 3,000 to 4,000. In some embodiments, the polythioether component will be terminated with non-reactive groups, such as alkyl, and in other embodiments will contain reactive groups in the terminal or pendant positions. Typical reactive groups are thiol, hydroxyl, amino, vinyl and epoxy. For a polythioether component that contains reactive functional groups, the average functionality typically ranges from 2.05 to 3.0, such as from 2.1 to 2.6. A specific average functionality can be achieved by suitable selection of reactive ingredients. Examples of suitable polythioethers are available from PRC-Desoto International, Inc., under the trademark PERMAPOL, such as PERMAPOL P-3.1 e or PERMAPOL P-3. As with the polysulfide component, combinations of polythioethers can be used to prepare the polythioether component according to the present invention.

The polymer blends of the present invention can be prepared according to any standard means known in the art, such as by mixing the polysulfide component and polythioether component and blending in a standard mixer such as a cowls mixer or planetary mixer. The ratio of polysulfide component to polythioether component in the blend can range from 10:90 to 90:10. A 50:50 ratio is particularly suitable for some embodiments, such as when making a Class A sealant. The molecular weight of the present polymer blend is typically from 1,000 to 8,000, such as 3,500 to 4,500, as measured theoretically or using GPC. The Tg of the polymer blend is typically −70° C. or lower, such as −60° C. or lower. The viscosity of the blend will typically be lower than the viscosity of a polysulfide having a comparable molecular weight; this contributes to ease of handling and use of the present blend and can minimize if not eliminate the need for solvents in certain sealants.

In some embodiments it may be desirable to further mix the polymer blend of the present invention with other polymers or additives to control various physical performance parameters of the blend. For example, the blend, with its relatively fast cure (i.e. faster than eight hours), can be mixed with a polymer having a relatively slow cure (i.e. greater than eight hours), to get the desired cure rate. In this embodiment, a suitable slow curing polymer is the reaction product of a polysulfide, DMDS, and an amine. Such a product is commercially available from PRC-DeSoto International, Inc. as PERMAPOL P.5.

A particularly suitable use for the blend of the present invention is in all classes of sealants. "Sealant" and like terms refer to compositions that have the ability to resist atmospheric conditions such as moisture and temperature and at least partially block transmission of materials such as water, fuel, and other liquids and gases. Sealants often have adhesive properties, as well. Sealants are generally identified by "Class", based on their viscosity. Class A sealants generally have a viscosity of 100 to 400 poise. Because these sealants are typically brush-applied, they are often referred to as a "brush coat". Class B sealants typically have a viscosity of 6000 to 18000 poise, and are typically applied through use of an extrusion gun or a spatula. These sealants are typically used on a fillet seal, and are commonly used as fuel tank sealants. Class C sealants generally have a viscosity between that of Class A and Class B sealants, such as from 1000 to 4000 poise. Class C sealants can be applied in various manners, such as with a brush, roller or extrusion gun, and are typically used for a "fay seal". Different classes of sealant are often used in combination. When different chemistries are present in the different sealants, compatibility issues can arise, particularly long-term compatibility. For example, the application of a polythioether-containing sealant on a cured polysulfide-containing sealant may fail over time. Compositions comprising the polymer blend of the present invention are extremely effective in promoting adhesion between a polysulfide-containing sealant and a polythioether-containing sealant. Because polysulfide chemistries and polythioether chemistries tend to be incompatible, it was surprising that the present polymer blends could be prepared, and then used in a sealant formulation. Indeed, a blend comprising a polysulfide sealant formulation and a polythioether sealant formulation could not be made.

In addition to its ability to promote compatibility or adhesion between two different sealant layers, the combination of polysulfide and polythioether chemistries in the present invention provides for the desired properties of each chemistry to be combined in one formulation. For example, in some embodiments, the blend has a lower viscosity than a polysulfide formulation, and a greater cold temperature stability than a polysulfide formulation and greater chemical resistance than a polythioether formulation. The cure rate of compositions comprising the present polymer blend are also faster than compositions comprising either polysulfide or polythioether alone. It is particularly desirable that aerospace sealants have a relatively long application time, (i.e., the time during which the sealant remains usable) and short curing time (i.e. the time required to reach a predetermined strength). Compositions comprising the present polymer blend can have an application time of about one hour and a cure time of about six hours.

The present polymer blends, as well as the compositions in which they are incorporated, also have a relatively low glass transition temperature ("Tg") (i.e. $\leq -70°$ C.). A low Tg is desired in many aerospace applications as it is indicative of good low temperature flexibility. Tg can be determined by known methods, for example, by DSC, DMA, or TMA, and by methods similar to those described in ASTM (American Society for Testing and Materials) D 522-88. In addition, the present polymers and compositions have excellent performance and handling properties and in some embodiments have good adhesion to various substrates.

The present invention is further directed to a composition comprising the polymer blend of the present invention. A particularly suitable composition is one used as a sealant. Sealants, according to the present invention, can be prepared having many different viscosities. Class A sealants prepared using the polymer blend of the present invention, i.e., having a viscosity of from about 100 to 400 poise, often require less solvent than other Class A sealants since the polymer blend has a lower viscosity than polysulfide alone. Class A sealants of the present invention, therefore, offer an environmental advantage. Class B sealants prepared using the present polymer blend, i.e., sealants having a viscosity of 6000 to 18000, often have a lower Tg and higher temperature resistance than Class B sealants prepared with polysulfide alone, and a better chemical resistance than sealants prepared with a polythioether alone. The present polymer blends can also be used in the preparation of Class C sealants, which have a viscosity of 1000 to 4000 poise.

As noted above, certain embodiments of the present polymer blends, and compositions comprising these blends, can be non-crystallizing. "Non-crystallizing" and like terms refer to polymers that are liquid at ambient temperature, and are not semi-crystalline waxes, gums, or solids. A non-crystallizing polymer, even when cooled to a sufficiently low temperature to become a solid, will be an amorphous solid which, when the temperature is raised to ambient, will return to the liquid state. Accordingly, the present invention is further directed to a noncrystallizing composition comprising a polymer blend comprising at least one polysulfide component and at least one polythioether component. In one embodiment, the molecular weight of the polysulfide component in the non-crystallizing composition is less than 1500, such as about 1000.

In addition to the polysulfide/polythioether blend described above, the compositions of the present invention typically further comprise a curing agent and one or more additional additives. The term "curing agent" refers to a material that can be added to the present polymer blend to accelerate the curing or gelling of the blend. "Curing" or "cure" refers to the point at which the sealant achieves a cure hardness of 30 Durometer "A" as measured according to ASTM D2240. Any suitable curing agent can be used. In certain embodiments, the curing agent contains oxidizing agents that oxidize terminal mercaptan groups to form disulfide bonds. Suitable oxidizing curing agents include, for example, lead dioxide, manganese dioxide, calcium dioxide, sodium perborate monohydrate, calcium peroxide, zinc peroxide, dichromate and epoxy. Other suitable curing agents may contain reactive functional groups that are reactive with the functional groups in the polymer blend. Examples include but are not limited to polythiols such as polythioethers; polyisocyanates such as isophorone, diisocyanate, and hexamethylene diisocyanate including mixtures thereof and including isocyanurate derivatives thereof; and polyepoxides. Examples of polyepoxides include hydantoin diepoxide, bisphenol-A epoxides, bisphenol-F epoxides, novolac type epoxides, aliphatic polyepoxides, and any of the epoxidized unsaturated and phenolic resins. The term "polyepoxide" refers to a material having a 1,2-epoxy equivalent greater than one and includes monomers, oligomers, and polymers.

Various additives such as fillers, adhesion promoters and plasticizers can also be used in the present compositions. Fillers useful in the present compositions, especially for aerospace applications, include those commonly used in the art, such as carbon black, calcium carbonate ($CaCO_3$), silica, nylon and the like. Potting compound fillers include high band gap materials such as zinc sulfide and inorganic barium compounds. In one embodiment, the compositions include about 10 to about 70 weight percent of the selected filler or combination of fillers, such as about 10 to 50 weight percent based upon the total weight of the composition.

One or more adhesion promoters can also be used. Suitable adhesion promoters include phenolics such as METHYLON phenolic resin available from Occidental Chemicals, organosilanes such as epoxy, mercapto or amino functional silanes such as A-187 and A-1100 available from Osi Specialties. An adhesion promoter can be used in an amount from 0.1 to 15 weight percent based upon total weight of the formulation.

A plasticizer can be used in the compositions in an amount ranging from 1 to 8 weight percent based upon total weight of the formulation. Useful plasticizers include phthalate esters, chlorinated paraffins, and hydrogenated terphenyls.

The compositions can further comprise one or more organic solvents, such as isopropyl alcohol, in an amount ranging from 0 to 15 percent by weight on a basis of total weight of the formulation, such as less than 15 weight percent or less than 10 weight percent.

Compositions of the present invention can also optionally include other standard additives, such as pigments; thixotropes; retardants; catalysts; and masking agents.

Useful pigments include those conventional in the sealant art, such as carbon black and metal oxides. Pigments can be present in an amount from about 0.1 to about 10 weight percent based upon total weight of the composition.

Thixotropes, for example fumed silica or carbon black, can be used in an amount from about 0.1 to about 5 weight percent based upon total weight of the composition.

Compositions of the present invention typically comprise 20 to 70 weight percent, such as 35 to 50 weight percent of the present polymer blend; from 1 to 50 weight percent, such as 5 to 25 weight percent or about 10 weight percent of a curing agent; and 10 to 50 weight percent, such as 5 to 30 weight percent or about 25 weight percent of other additives, with weight percent being based on the total weight of the composition.

The present compositions are typically packaged as a two-component or "2K" systems. One component comprises the polymer blend of the present invention and various additives, such as filler(s), extender(s), adhesion promoter(s), accelerator(s), and/or (retardant(s); the second component generally comprises the curing agent and various additives, such as plasticizer(s), filler(s), accelerator(s), and/or retardant(s). The two components are then mixed immediately prior to use. For example, the two components can be mixed using a specially adapted cartridge/rod system such as that commercially available from PRC-DeSoto International, Inc. as SEMKIT. Alternatively, the components can be mixed together and the mixture maintained at a temperature below that at which the curing agent is reactive. The term "reactive" means capable of chemical reaction and includes any level of reaction from partial to complete reaction of a reactant. A storage temperature of below about −40° C. is typically suitable to retard or prevent the reaction between the curing agent and the polysulfide and/or polythioether components of the polymer blend.

Because the compositions of the present invention find particular application in compatibilizing polysulfide and polythioether chemistries, the present compositions, when used in a sealant formulation, are particularly useful when making repairs. "Repair" is typically needed in the case of sealant leakage or damage. For example, a sealant having polysulfide chemistry may be deposited on a substrate. If a polythioether layer was deposited directly on top of the polysulfide layer, it would not maintain compatibility over the long term with the already-cured polysulfide layer. Application of the present sealant to the already-cured polysulfide layer facilitates adhesion with the subsequently deposited polythioether layer. Accordingly, the present invention is further directed to a method for repairing a sealant comprising applying the present composition to an already-cured first sealant, and depositing a second sealant onto the composition of the present invention; either the first or second sealant utilizes polysulfide chemistry and the other utilizes polythioether chemistry. The second sealant can be deposited onto the composition of the present invention at any time, such as while it is still wet, when it has undergone sufficient cure so as to be "tack-free", or after more advanced levels of curing.

A multilayer sealant combination is also the subject of the present invention, comprising a first sealant layer, and a second sealant layer, wherein a layer of the sealant of the present invention is between the first sealant layer and second sealant layer; again, either the first or second sealant layers will be based on polysulfide chemistry and the other will be based on polythioether chemistry.

The compositions of the present invention can be applied to any number of substrates including, for example, titanium, stainless steel, aluminum, and the primed, organic coated and chromate forms thereof, epoxy, urethane, graphite, fiber glass composite, KEVLAR, acrylics and polycarbonates. The present compositions are particularly useful in aerospace applications, such as aerospace sealants and the linings for fuel tanks, fuselages, and the like. An aerospace sealant material according to the present invention can exhibit properties including high temperature resistance, fuel resistance and flexural strength. The formulations described herein are also well suited for uses in which temperature extremes, chemically harsh environments and/or mechanical vibrations are experienced.

The polymer blend of the present invention is generally ungelled, which means that the polymer blend has an intrinsic viscosity that can be measured. The present polymer blends, however, as noted above, are capable of being cured with a suitable curing agent. The cured formulations of the present invention generally have good low temperature flexibility, which is desired in aerospace applications since the formulations are subjected to wide variations in environmental conditions, such as temperature and pressure, and physical conditions such as joint contraction and expansion and vibration.

Viscosities as reported herein are measured at a temperature of about 25° C. and a pressure of about 760 mm Hg determined according to ASTM D-2849, paragraphs 79-90 using a Brookfield Viscometer.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Also, as used herein, the term "polymer" is meant to refer to prepolymers, oligomers and both homopolymers and copolymers; the prefix "poly" refers to two or more.

EXAMPLE

The following example is intended to illustrate the invention, and should not be construed as limiting the invention in any way.

A Class A sealant was prepared by mixing the components listed in Table 1 in a double shaft cowls type batch mixer until homogeneous under a vacuum of 27 inches of mercury or greater. Component B represents the polymer blend of the present invention and Component A represents an accelerator. Components B and A were mixed in a weight ratio of 100:12 to prepare the final sealant. The sealant was tested to the requirements of BMS 5-45 Rev. B Class A Grade 1. For example, long-term compatibility of the sealant was tested. The sealant comprising the blend was applied over a cured polysulfide aerospace sealant that had been previously exposed to jet reference fluid; the sealant comprising the blend was allowed to cure to a tack-free condition and then a polythioether sealant was applied over the sealant comprising the blend, allowed to cure for 14 days, immersed in jet reference fluid at 140° F. for 42 days then tested for adhesion to BMS 5-45 Rev. B requirements.

TABLE 1

| Ingredient | Weight Percent |
|---|---|
| Component A | |
| Polythioether[1] | 23.91 |
| Polysulfide[2] | 23.91 |
| Phenolic resin[3] | 0.71 |
| Sulfur-containing Phenolic | 0.47 |
| Sulfur-containing Phenolic | 0.30 |
| Silica[4] | 0.14 |
| Silica[5] | 3.32 |
| Titanium dioxide[6] | 1.90 |
| Blue color paste[7] | 0.95 |
| Polyamide[8] | 2.37 |
| Sulfur[9] | 0.06 |
| Calcium carbonate[10] | 19.00 |
| Stearic acid | 0.10 |
| Polysulfide latex | 0.66 |
| Amino silane[11] | 0.84 |
| Ethyl acetate | 7.12 |
| Toluene | 14.24 |
| Component B | |
| $MnO_2$ | 54.0 |
| Plasticizer[12] | 34.0 |
| Stearic acid | 0.6 |
| Sodium stearate | 0.7 |
| Molecular sieve powder[13] | 0.7 |
| Dipentamethylene/thiuram/polysulfide mixture[14] | 5.0 |
| Silane adhesion promoter | 5.0 |

[1]PERMAPOL P-3.1e from PRC-DeSoto International, Inc.
[2]THIOPLAST G-1, LP-2 from Akzo Nobel.
[3]METHYLON 75108, from Occidental Chemical or Durez Corp.
[4]CAB-O-SIL TS-720, from Cabot Corp.
[5]SIPERNAT D13, from Degussa Corp.
[6]TI-PURE R-900, from DuPont.
[7]SUNFAST BLUE, from Sun Chemical Corp.
[8]ORGASOL, from Atofina.
[9]Sulfur, rubber makers from Reagent Chemical and Research Inc..
[10]SOCAL 31, from Solvay.
[11]SILIQUEST A-1100, from OSI Corp., a Crompton Company.
[12]Partially hydrogenated terphenyl (HB-40 from Solutia).
[13]Alkali metal alumino-silicate 3-angstrom powder from UOP.
[14]Akrochem Accelerator DPTT Powder from Akrochem Corp.

Whereas particular embodiments of this invention have been described above for purposes of illustration, it will be evident to those skilled in the art that numerous variations of the details of the present invention may be made without departing from the invention as defined in the appended claims.

What is claimed is:

1. A multilayer sealant comprising:
   a) a first sealant layer;
   b) a second sealant layer over at least a portion of the first sealant layer; and
   c) an intermediate sealant layer between the first and second sealant layers deposited from a composition comprising a polymer blend comprising (i) at least one polysulfide component and (ii) at least one polythioether component, wherein either the first or second sealant layer is based on polysulfide chemistry and the other of the first or second sealant layer is based on polythioether chemistry.

2. The multilayer sealant of claim 1, wherein the ratio of (i):(ii) is 10:90 to 90:10.

3. The multilayer sealant of claim 2, wherein the ratio of (i):(ii) is 50:50.

4. The multilayer sealant of claim 1, wherein the polysulfide component comprises more than one polysulfide polymer.

5. The multilayer sealant of claim 4, wherein one polysulfide polymer in the polysulfide component has a molecular weight of 1000 and one polysulfide polymer in the polysulfide component has a molecular weight of 4000.

6. The multilayer sealant of claim 1, wherein the polysulfide component has a number average molecular weight of 1000 to 4000.

7. The multilayer sealant of claim 1, wherein the polythioether component has a number average molecular weight of 3000 to 4000.

8. The multilayer sealant of claim 7, wherein the polythioether component has an average functionality from 2.1 to 2.6.

9. The multilayer sealant of claim 1, wherein the number average molecular weight of the polysulfide component is less than 1500.

10. The multilayer sealant of claim 1, wherein the composition of the intermediate sealant layer c) has a viscosity of 100 to 400 poise.

11. The multilayer sealant of claim 1, wherein the composition of the intermediate sealant layer c) has a viscosity of 6000 to 18000 poise.

12. The multilayer sealant of claim 1, wherein the composition of the intermediate sealant layer c) has a viscosity of 1000 to 4000 poise.

13. The multilayer sealant of claim 1, wherein the polymer blend of the intermediate sealant layer c) has a Tg of −70° C., or less.

14. The multilayer sealant of claim 1, wherein the composition of the intermediate sealant layer c) further comprises a curing agent.

15. The multilayer sealant of claim 14, wherein the curing agent comprises an oxidizing agent.

16. The multilayer sealant of claim 15, wherein the curing agent comprises magnesium dioxide.

17. The multilayer sealant of claim 1, wherein the composition of the intermediate sealant layer c) further comprises at least one additive selected from fillers, adhesion promoters, plasticizers, pigments, thixotropes, retardants, catalysts, and masking agents.

18. The multilayer sealant of claim 17, wherein the composition of the intermediate sealant layer c) comprises a filler.

19. The multilayer sealant of claim 1, wherein the first sealant layer a) is based on polysulfide chemistry and the second sealant layer b) is based on polythioether chemistry.

20. The multilayer sealant of claim 1, wherein the first sealant layer a) is based on polythioether chemistry and the second sealant layer b) is based on polysulfide chemistry.

21. The multilayer sealant of claim 1, wherein the first sealant layer a) is cured prior to application of the intermediate sealant layer c).

22. The multilayer sealant of claim 1, wherein the multilayer sealant demonstrates improved adhesion compared with a multilayer sealant without the intermediate sealant layer c).

23. A substrate at least partially coated with the multilayer sealant of claim 1.

* * * * *